US012678921B2

(12) United States Patent
Abel

(10) Patent No.: US 12,678,921 B2
(45) **Date of Patent: *Jul. 14, 2026**

(54) TORQUE WRENCH WHICH CAN BE USED AS A RATCHET

(71) Applicant: Wera Werkzeuge GmbH, Wuppertal (DE)

(72) Inventor: Michael Abel, Radevormwald (DE)

(73) Assignee: Wera Werkzeuge GmbH, Wuppertal (DE)

( * ) Notice: Subject to any disclaimer, the term of this patent is extended or adjusted under 35 U.S.C. 154(b) by 14 days.

This patent is subject to a terminal disclaimer.

(21) Appl. No.: 18/358,604

(22) Filed: Jul. 25, 2023

(65) Prior Publication Data

US 2023/0405778 A1 Dec. 21, 2023

Related U.S. Application Data

(63) Continuation of application No. 17/434,980, filed as application No. PCT/EP2019/084226 on Dec. 9, 2019, now Pat. No. 11,752,603.

(30) Foreign Application Priority Data

Dec. 12, 2018 (DE) ..................... 10 2018 131 903.7

(51) Int. Cl.
*B25B 23/14* (2006.01)
*B25B 13/46* (2006.01)
*B25B 23/142* (2006.01)

(52) U.S. Cl.
CPC .......... *B25B 23/141* (2013.01); *B25B 13/463* (2013.01); *B25B 23/1427* (2013.01)

(58) Field of Classification Search
CPC . B25B 23/141; B25B 23/1427; B25B 13/461; B25B 13/462; B25B 13/463;
(Continued)

(56) References Cited

U.S. PATENT DOCUMENTS 2,773,370 A * 12/1956 Intraub ..................... F16D 7/10 192/104 C
3,707,893 A 1/1973 Hofman
(Continued)

FOREIGN PATENT DOCUMENTS

CN 201020685 Y 2/2008
DE 102008055581 A1 6/2010
(Continued)

OTHER PUBLICATIONS

English translation of DE 202018003607U1 (Year: 2018).*
(Continued)

*Primary Examiner* — David S Posigian
*Assistant Examiner* — Sukwoo James Chang
(74) *Attorney, Agent, or Firm* — Whitmyer IP Group LLC

(57) ABSTRACT

A screw driving tool includes a torque output element which defines an axis and is mounted in a housing, a torque transmission section with a plurality of depressions, and a torque transmission element, which is pre-tensioned by the force of a force accumulator and engages into at least one of the depressions, for coupling the torque transmission section to the housing so as to transmit a torque. The coupling is released when the torque transmission element leaves the depression in an edge-controlled manner against the force of the force accumulator, which is adjustable by an adjustment device, when a limit torque is exceeded. A switchover element is movable from a release position into a blocking position and allows the torque transmission element to leave the depression in the release position but blocks the torque transmission element in the blocking position.

13 Claims, 6 Drawing Sheets

(58) Field of Classification Search
CPC ... B25B 23/1422; B25B 13/468; B25B 13/00; B25B 13/02; B25B 21/004; B25B 21/008
USPC .................................... 81/467–483, 60–63.2
See application file for complete search history.

(56) References Cited

U.S. PATENT DOCUMENTS

| | | | | | |
|---|---|---|---|---|---|
| 4,655,104 | A * | 4/1987 | Blattner | B25B 23/1427 81/483 |
| 5,337,638 | A * | 8/1994 | Coss | B25B 23/1427 173/176 |
| 5,557,994 | A | 9/1996 | Nakayama | |
| 7,458,297 | B1 | 12/2008 | Shiao | |
| 7,571,668 | B1 * | 8/2009 | Chang | B25B 13/463 81/57.29 |
| 2010/0326248 | A1 | 12/2010 | Owoc | |

FOREIGN PATENT DOCUMENTS

| | | | | |
|---|---|---|---|---|
| DE | 102012103782 | A1 * | 10/2013 | B25B 13/46 |
| DE | 102017107784 | A1 | 5/2018 | |
| DE | 202018003607 | U1 * | 9/2018 | B25B 13/462 |

OTHER PUBLICATIONS

English translation of DE 102012103782A1 (Year: 2013).*
International Preliminary Report on Patentability; Application No. PCT/EP2019/084226; Issued: Jun. 8, 2021.
International Search Report and Written Opinion of the International Searching Authority; Application No. PCT/EP2019/084226; Completed: Mar. 12, 2020; Mailing Date: Mar. 19, 2020; 7 Pages.

* cited by examiner

TORQUE WRENCH WHICH CAN BE USED AS A RATCHET

TECHNICAL FIELD

The invention relates to a screw driving tool comprising a torque output element which defines an axis and is mounted in a housing, a torque transmission section with a plurality of depressions, and a torque transmission element, which is pretensioned by a force of a force accumulator and engages in at least one of the depressions, for coupling the torque transmission section to the housing so as to transmit a torque, said torque-transmitting coupling being released when the torque transmission element leaves the depression in an edge-controlled manner against the force of the force accumulator, which can be adjusted by an adjustment device, when a torque limit is exceeded.

BACKGROUND

A screw driving tool of the aforementioned type is known from DE 20 2018 003 607 U1. The screw driving tool described there comprises a housing with a head and a drive arm projecting from the head. Located in the head is a torque output element with a square section, onto which a nut or another screw output tool can be fitted. The torque output element comprises external toothing with gaps arranged between teeth. The torque transmission element engages in one of the gaps and is acted upon by a ram, which in turn is acted upon by a compression spring. The pretensioning of the compression spring can be adjusted. The adjusted pretensioning of the compression spring defines a torque limit, which is transmitted from the housing to the torque output element. If the torque exceeds the torque limit, the torque transmission element leaves the depression. This takes place guided by inclined edge. The blocking element can then run over the tooth adjacent to the depression. The drive arm projecting from the head radially from the axis of rotation can thus, as it were, be swivelled free, without the torque output element rotating along with it. Only limited torques can thus be transmitted to the screw connection with the screw driving tool.

DE 10 2008 055 581 A1 describes a torque wrench with a head, in which a freewheel gear is arranged. The head sits in a forked end of a two-part arm. A first part of the arm comprising the fork is fastened in a swivelable manner to the second part of the arm, which comprises a handle. When the torque limit is exceeded, the two parts of the arm can swivel slightly with respect to one another, which is accompanied by a click noise, which indicates that a torque limit is reached.

DE 10 2012 103 782 A1 describes a ratchet wrench, wherein a torque output element is arranged in a head, from which a drive arm projects, and which is connected via a freewheel lock to the head. A displaceable polygonal section lies in the freewheel lock, which can optionally project out of the broad sides of the torque output element, so that a screw can be turned both in the clockwise direction and also in the anticlockwise direction with the screw driving tool.

Screw driving tools of the type described above are also disclosed in CN 201020685, DE 10 2017 107 784 A1 and U.S. Pat. No. 3,707,893 A.

SUMMARY

The problem underlying the invention is to develop the screw driving tool in an advantageous way for its use. This problem is solved by the invention specified in the claims.

A screw driving tool designed according to the invention is characterised, firstly and essentially, by the fact that a switchover element is provided. The switchover element can be moved from a release position into a blocking position. In the release position, the torque transmission element can, as described above, leave the depression when a torque limit is reached. In the blocking position, this is not however possible. In the release position, the tool has the function of a torque wrench. In the blocking position, the tool has the function of a standard screw driving tool, with which torques can also be transferred which lie above the torque limit. Provision is in particular made such that the screw driving tool comprises a freewheel gear between the torque transmission section and the torque transmission element, so that the screw driving tool can be used in the blocking position as a ratchet wrench, as is described in DE 10 2012 103 782 A1. In a development of the invention and/or of the prior art or of the invention, a freewheel gear is provided in the torque transmission path between the torque output element and the torque transmission section. As a result of this configuration, the torque wrench can also be used in confined spaces, since swivelling back and forth of, for example, a handle arm arranged on a head is sufficient to gradually transmit a rotary motion to a screw. In the end phase of the screwing of a screw, the torque transmitted by the screw driving tool to the screw increases, until a torque limit is reached. The torque transmission element then slips out of the depression of the torque transmission section, so that the screw can only be screwed with an adjustable torque limit.

In a preferred variant of the invention, a switchover element is provided, which is constituted as a sleeve part. The sleeve part can be moved with respect to the housing. In particular it can slide with respect to the housing. The switchover element can cooperate with at least one blocking element. Preferably, however, the switchover element cooperates with a plurality of blocking elements. The blocking element can be a ball. The housing can comprise a window, in which the blocking element is arranged. The housing and in particular an arm of the housing preferably comprises a tube, in which the at least one window is arranged. If a plurality of blocking elements is provided, the housing comprises a plurality of windows. A ram can be arranged inside the housing. The ram lies in the force transmission path between the torque transmission element, which can be a ball, and the force accumulator which can be a compression spring. The ram can comprise one or more blocking recesses. The blocking recesses are arranged in such a way that they are assigned spatially to a window of the housing when the torque transmission element is located in one of the plurality of depressions. By shifting the switchover element and in particular by moving the switchover element with respect to the housing, the switchover element can be moved back and forth between a release position and a blocking position. In the release position, the blocking element can leave the blocking recess, in order to enter for example into a bypass space of the switchover element. In this position, the ram can move with respect to the housing. In particular, it can move linearly in the tube. In the blocking position, the blocking element is prevented from coming out of the blocking recess, for example due to the fact that an opening of the window pointing in the exterior direction of the housing is closed due to an abutment edge of the switchover element. In the blocking position, the blocking element cannot leave the blocking recess. If a torque is applied to the housing, this torque is transmitted to the torque transmission section with the torque transmission element, which engages in a form-fit manner in a depression of the torque transmission section. The torque transmission element constituted as a circular cylinder lies in a depression, the bottom of which is adapted to the contour of the torque transmission element. The bottom of the depression extends in particular along an inner cylinder surface. In a cross-sectional plane, the bottom runs between the two tips of the teeth adjacent to the depression on a circular arc line, wherein the arc angle is less than 90°. The sections of the bottom wall of the depression adjacent to the teeth thus form inclined edges, in order to apply force to the torque transmission element when a torque is applied. In the blocking position, these forces are diverted via the blocking elements into the housing, i.e. in particular the tube. The torque transmission section is connected via the freewheel gear to the torque output element, so that the torque is transmitted to the torque output element. The latter can comprise an output peg, on which a nut or suchlike can be fitted, in order to transmit the torque to a screw head or a nut. In the blocking position, the ram cannot move with respect to the housing. The depression comprises inclined edges and rounded edges, which convert the torque into a force, which forces a torque transmission element out of the depression. The force acts on the ram, which is acted upon by the spring of the force accumulator. When the switchover element is in the release position, the ram can move with the technical outcome described above, that when an adjustable force limit is exceeded, the torque transmission element slips out of the depression and for example runs over a tooth adjacent to the depression, in order to enter into a further depression. In the blocking position, a displacement of the ram is not possible, so that the torque transmission element is held permanently in a form-fit manner in the depression. The torque transmission section preferably has a cogwheel-like form with teeth distributed uniformly in the circumferential direction, between which the depressions are located in each case. The torque transmission section mounted rotatably in a head of the housing, and which is preferably located radially outside the torque output element, can thus rotate through any angular degrees inside its bearing opening in the head, when the torque applied to it exceeds the torque limit. The torque output element can comprise an output peg, which can be adjusted in the axial direction relative to the axis of rotation, as is previously known from DE 10 2012 103 782 A1. The content of this publication is included in full in the disclosure content of this application. The output peg has on both sides a polygonal section, which can optionally project out of one of the two broad sides of the head pointing away from one another, so that the screw driving tool can be used to screw both in the clockwise and in the anticlockwise direction. In this development of the invention, provision is made is such that the ram comprises two, three or four or more blocking recesses arranged on a peripheral surface. The blocking recesses are each assigned spatially to a window, in which a blocking element lies. The blocking recesses or the windows can be arranged in a uniform circumferential distribution about an axis of extension of the drive arm. An adjustment device can be located at the end of the drive arm, which can be used as a handle or is adjacent to a handle and with which, by rotating the handle, the force of the force accumulator and therefore the torque limit can be adjusted. A locking element can be provided, with which the rotatability of the adjustment device can be blocked. The drive arm preferably projects in the radial direction relative to a screw rotation axis. The teeth of the torque transmission section preferably project radially outwards, so that they form an external toothing system. The torque transmission element lying in the tooth gap is preferably moved in the radial direction out of the depression. The ram is also moved in the radial direction relative to the screw rotation direction, in order to compress the pretensioned spring located in a cavity of the drive arm. The drive arm is thus preferably constituted as a tube. The switchover element can preferably be arranged linearly displaceable on this tube, wherein the switchover element is preferably arranged directly adjacent to the head.

BRIEF DESCRIPTION OF THE DRAWINGS

An example of embodiment of the invention is explained below with the aid of the appended drawings. In the figures.

DETAILED DESCRIPTION

The screw driving tool represented in the figures has a housing 1, which comprises a head 2 at a first end. Head 2 has a cavity, in which a rotatable body lies. The rotatable body is in several parts. It has a torque output element 4 with a polygonal cavity, in which an output peg fits, which is displaceable relative to axis of rotation A of torque output element 4, in order to project in each case with a polygonal section either on the one or the other broad side of the head.

Figure 7:
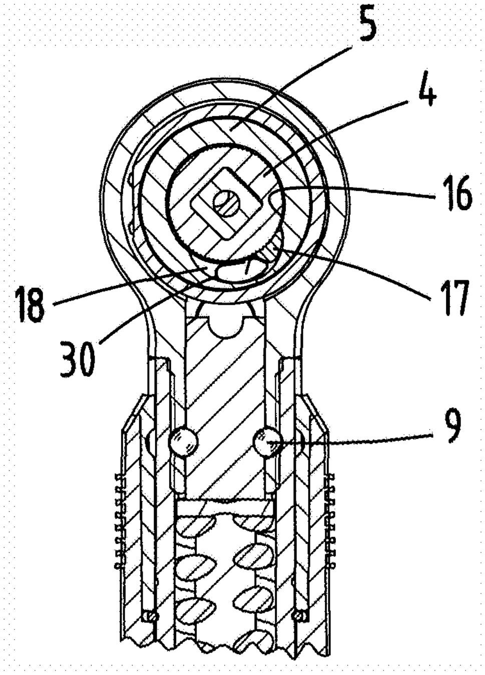
FIG. 7 shows the cross-section through line VII-VII in FIG. 3.

Torque output element 4 is coupled by a freewheel gear, which can be seen in FIG. 7, with a torque transmission section 5. Torque transmission section 5 has a cavity for this purpose, in which torque output element 4 fits. Torque output element 4 has an external toothing system 16, into which a locking element 17 lying in a bearing recess 18 of torque output section 5 can engage. Locking element 17 is acted upon by a spring 30 into a locking position, so that, when torque transmission section 5 is rotated in the clockwise direction, torque output element 4 is dragged along in rotation. If, on the other hand, torque transmission section 5 is rotated in the anticlockwise direction, the counter-toothing of locking element 17 can leave the external toothing system of torque output element 4, so that torque transmission section 5 can rotate freely with respect to torque output element 4. With regard to the embodiment of the freewheel gear, reference is made to DE 10 2016 101 400 A1 and to DE 10 2014 113 758 A1 cited therein. The disclosure of these publications is included in the disclosure content of this application.

Figure 1:
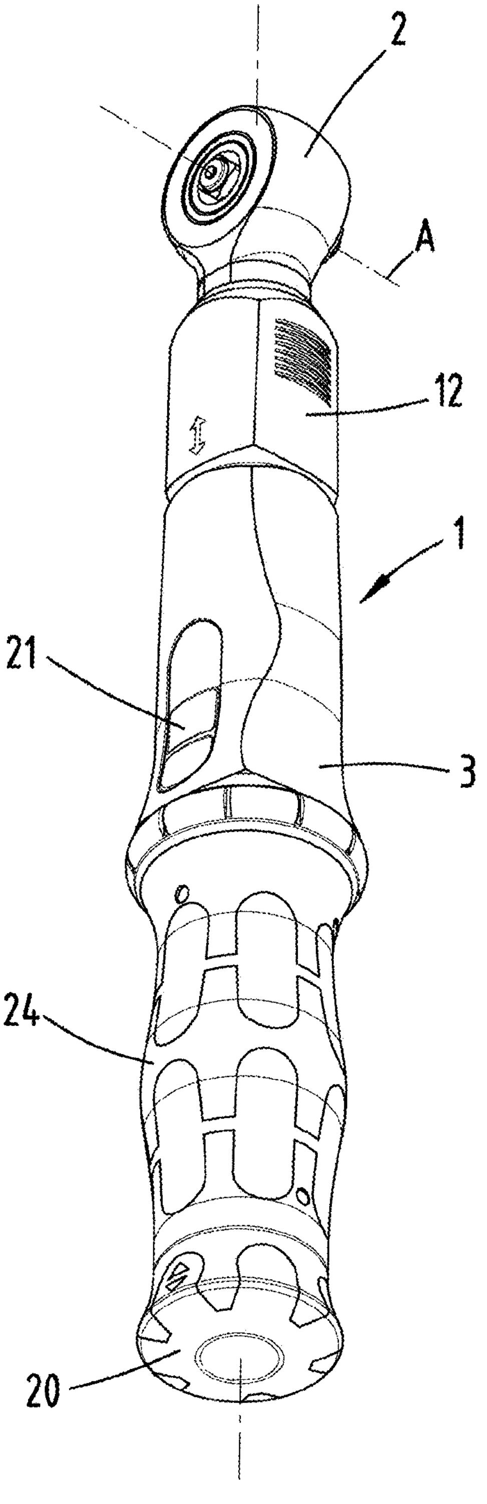
FIG. 1 shows a perspective representation of a screw driving tool.
Figure 2:
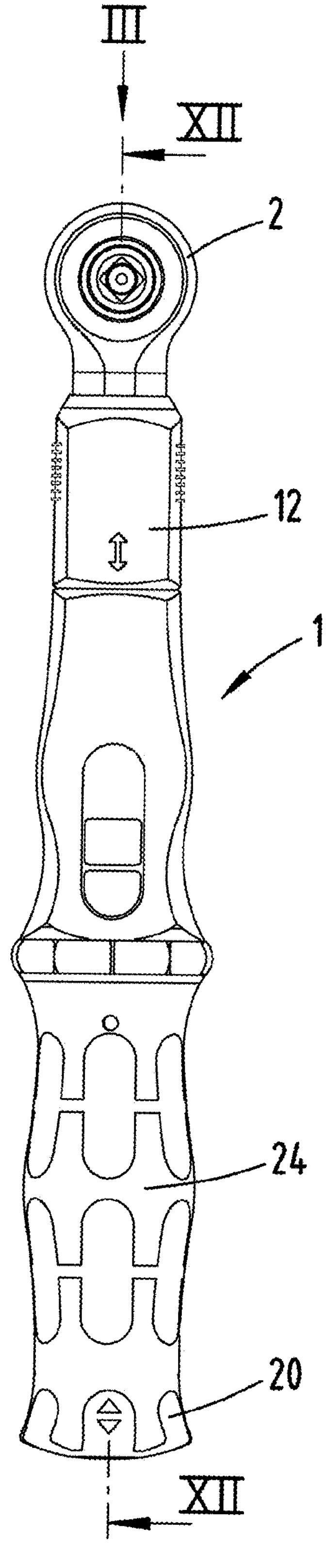
FIG. 2 shows a plan view of the screw driving tool.
Figure 3:
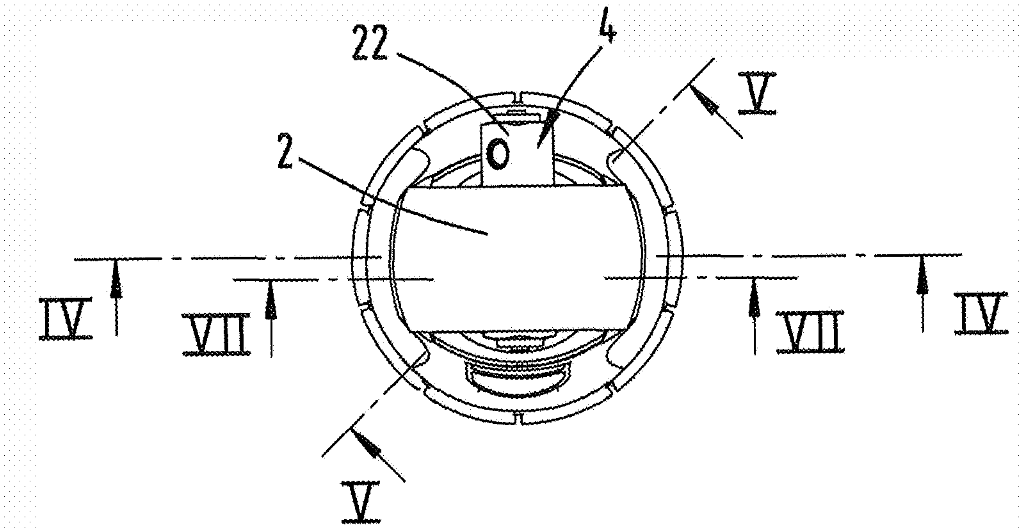
FIG. 3 shows the view in the direction of arrow III in FIG. 2.
Figure 4:
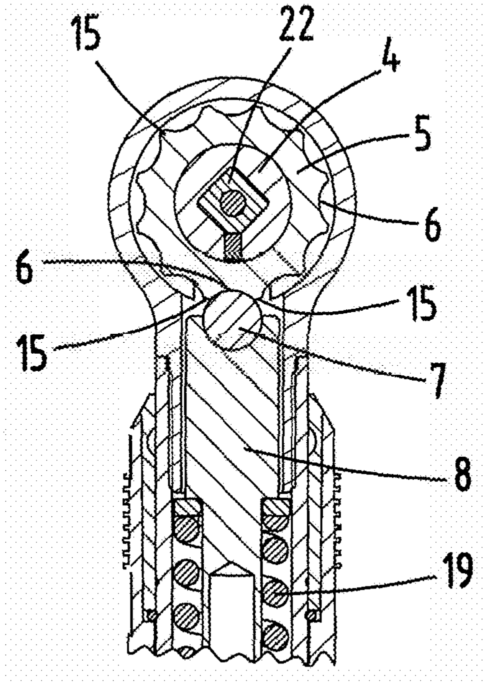
FIG. 4 shows the cross-section through line IV-IV in FIG. 3.
Figure 8:
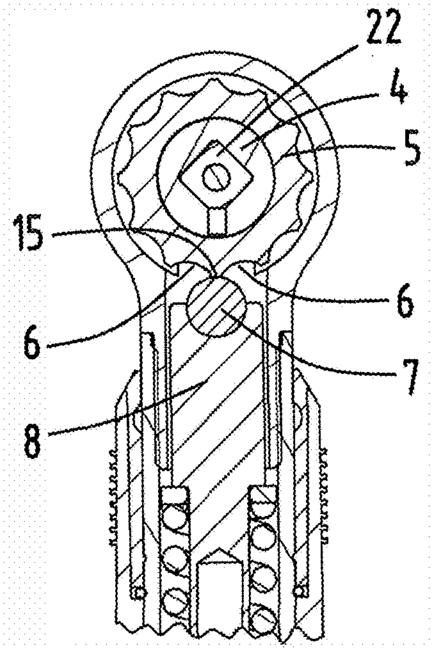
FIG. 8 shows a representation according to FIG. 4, wherein however a torque transmission element 7 has come out of a depression 6 and runs over a tooth 15.
Figure 10:
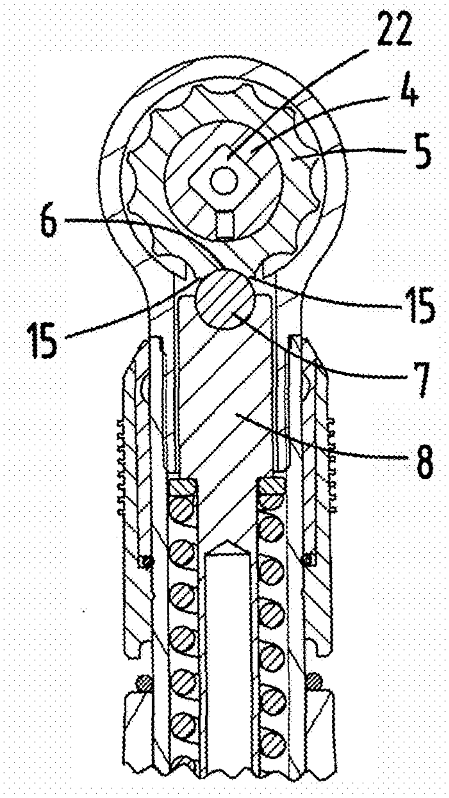
FIG. 10 shows a representation according to FIG. 4, but with a switchover element 12 shifted from a release position into a blocking position.

As can be seen in FIG. 4, 8 or 10, torque transmission section 5 comprises teeth 15 pointing radially outwards relative to the screw rotation direction and arranged in a uniform circumferential distribution about the centre. Trough-shaped tooth gaps, which form depressions 6, are located between the teeth. The wall of depression 6 is formed by a rounding. The rounding corresponds to a rounding of a torque transmission element 7 constituted by a cylinder, which can engage in one of depressions 6.

Torque transmission element 7 is acted upon by a ram 8, which extends in a cavity of a drive arm 3, which projects in the radial direction from head 2 relative to the screw rotation direction. Ram 8 is acted upon by a compression spring 19, which forms a force accumulator and which is pretensioned. By means of an adjustment device 20, which is assigned to a handle 24 arranged at the free end of drive arm 3, the pretensioning of compression spring 19 can be adjusted. By rotating adjustment device 20, a clamping element 27 coupled via a thread with a tube 23 constituted by arm 3 is displaced axially relative to tube 23. A display 25 is provided, which can be observed through window 21, on which the currently adjusted torque is displayed. Clamping element 27 acts against a thrust piece 26 which acts on spring 19, which rests at its other end on ram 8.

Figure 6:
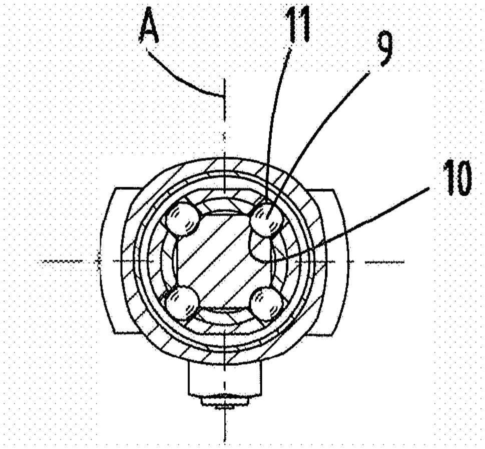
FIG. 6 shows the cross-section through line VI-VI in FIG. 5.

Ram 8 comprises on its lateral wall a total of four blocking recesses 10 arranged in a uniform circumferential distribution (see FIG. 6), in which a blocking element 9 in the form of a ball lies in each case. Relative to the axis of extension of drive arm 3, each of the four blocking elements 9 can move in a radial direction inside a window 11 of tubular drive arm 3, in order to leave blocking recess 10 in a release position of a switchover element 12. For this purpose, switchover element 12 and in particular its inner wall has a bypass space 13.

Switchover element 12 is constituted as a sleeve-like slide and sits outside on drive arm 3 and more precisely in the immediate vicinity of head 2. By moving switchover element 12 in an axial direction relative to the axis of extension of drive arm 3, switchover element 12 can be brought from a release position into a blocking position. In the release position, which is represented in FIGS. 4 to 9, blocking elements 9 can leave blocking recesses 10 in the radial direction, so that ram 8 can move inside drive arm 3. A casing 28, which adjoins flush with handle 24, sits on tube 23, which is connected fixedly to head 2. This casing comprises, on its side pointing towards head 2, a step which forms an end stop for switchover element 12. In the release position, in which the tool comprising a torque wrench can be used, switchover element 12 abuts against a casing 28. The outer lateral surface of switchover element 12 transitions flush into the outer lateral surface of casing 28, which is fastened to tube 23 by means of grub screws 29.

Figure 11:
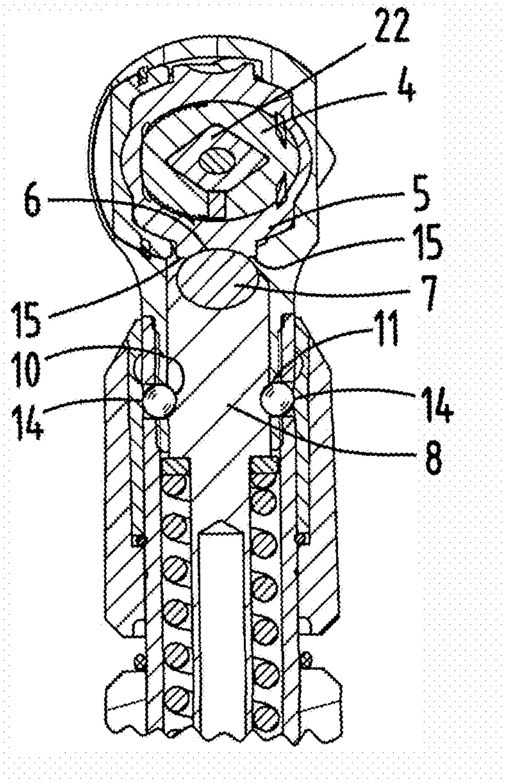
FIG. 11 shows a representation according to FIG. 5, but in the operating position represented in FIG. 10.
Figure 12:
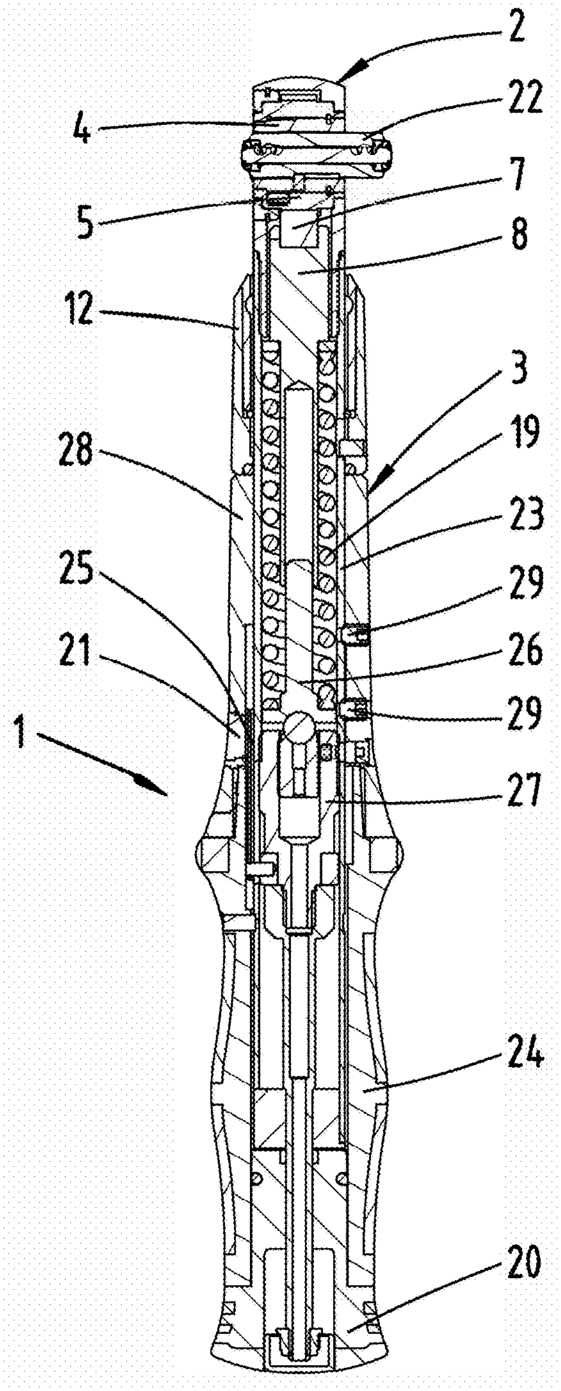
FIG. 12 shows a cross-section through line XII-XII in FIG. 2.
Figure 13:
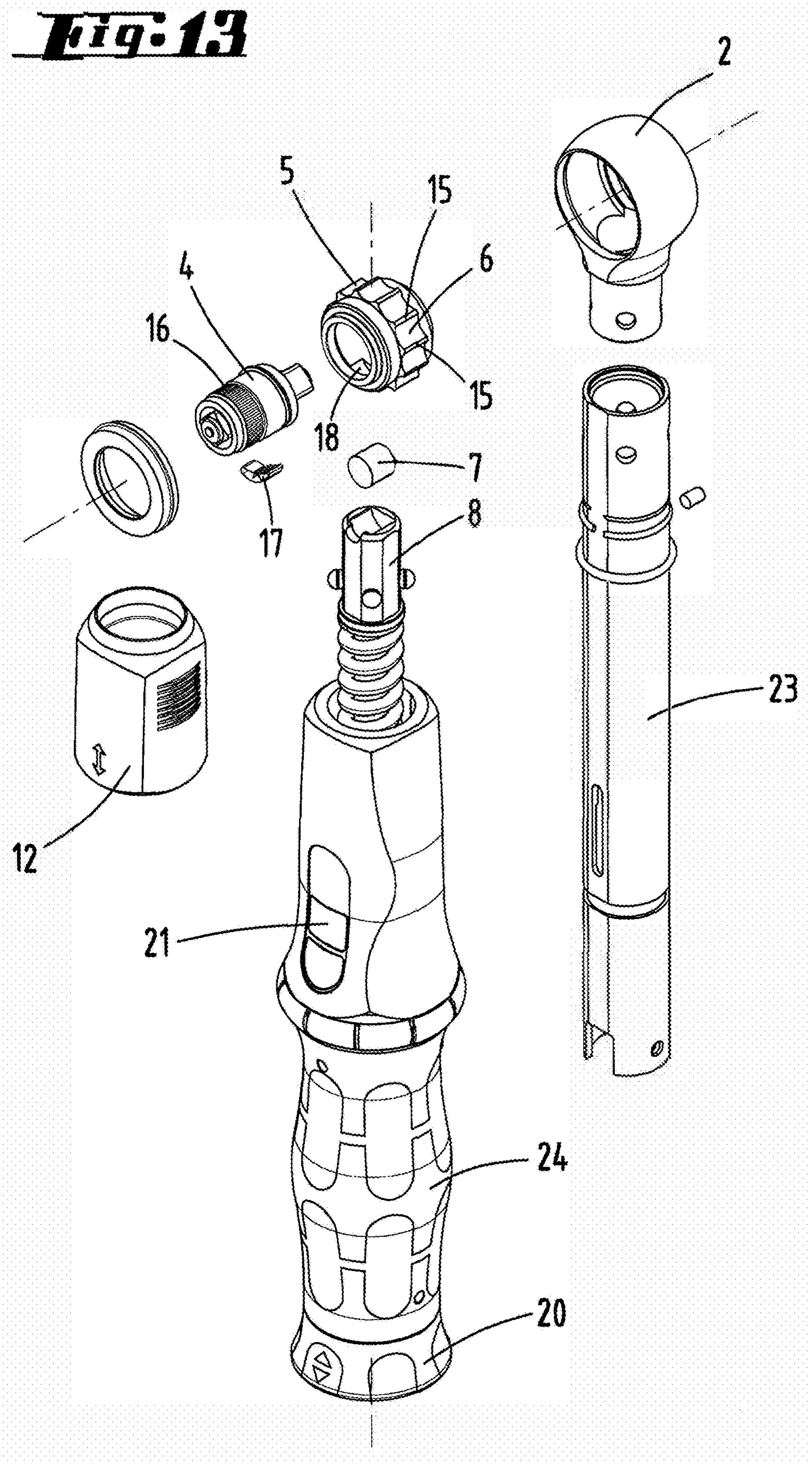
FIG. 13 shows an exploded representation.

In the blocking position of switchover element 12 represented in FIGS. 10 and 11, abutment edge 14 lies outside window 11 and is constituted by the inner wall of switchover element 12. Supported on this abutment edge 14 are blocking elements 9, which lie in blocking recess 10, so that they cannot move out of blocking recess 10 and thus prevent an axial displaceability of ram 8 relative to the direction of extension of drive arm 3. The inner radius of abutment edge 14 running on an inner cylindrical lateral surface is only slightly larger than the outer radius of tube 23 comprising window 11. In the blocking position, switchover element 12 is spaced apart from casing 28.

The functioning of the screw driving tool is as follows:

On account of the freewheel gear described above between torque output element 4 and torque transmission section 5, an output peg 22 can be rotated in a constant rotary movement, in that drive arm 3 is swivelled back and forth about the screw axis. By moving output peg 22 in an axial direction relative to the screw rotation direction, the direction of rotation of the screw driving tool can be turned round.

Figure 5:
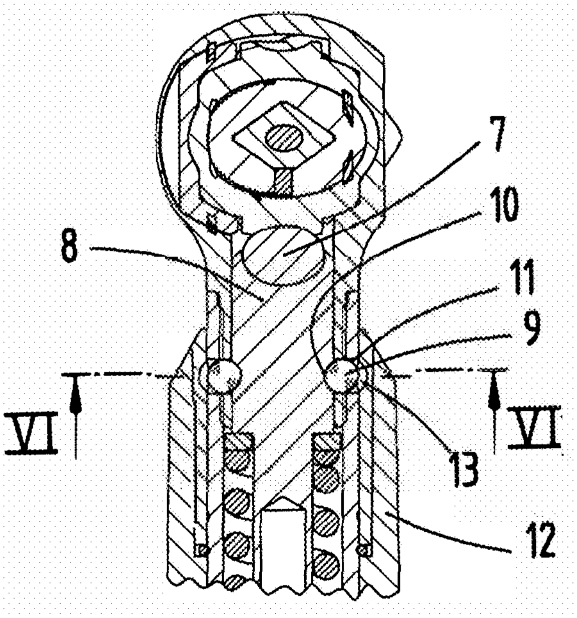
FIG. 5 shows the cross-section through line V-V in FIG. 3.
Figure 9:
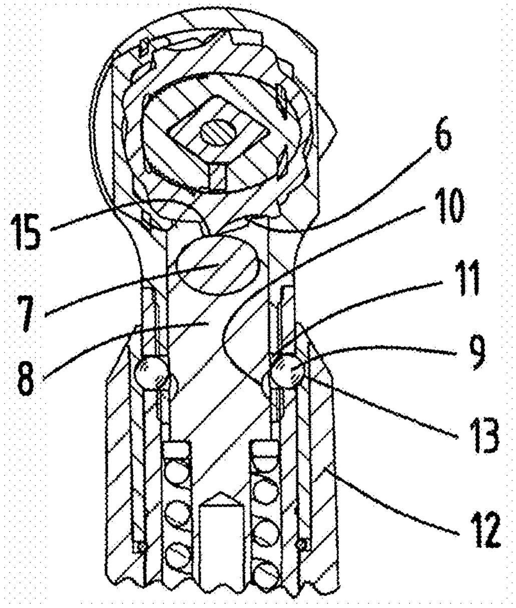
FIG. 9 shows a representation according to FIG. 5, but in an operating position according to FIG. 8.

When switchover element 12 is in the release position shown in FIGS. 4 to 9, in which ram 8 can move with respect to drive arm 3, a limited torque can be transmitted by the screw driving tool to the screw. When the torque lies below a torque limit which can be adjusted by means of adjustment device 20, torque transmission element 7 remains in the plurality of depressions 6 during the screwing, as is shown in FIGS. 4 and 5. By means of torque transmission element 7, a torque is transmitted from housing 1 to torque transmission section 5. The trough, which forms depression 6, forms an inclined edge, which converts the torque into a radial force, which acts against the pretensioning force of spring 19. The effect of this is that torque transmission element 7 and with it ram 8 are moved in the radially outward direction relative to the screw rotation axis, which is accompanied by an increase in the spring tensioning. When ram 8 is moved in the direction of thrust piece 26, a peg of thrust piece 26 moves in a cavity of ram 8. Compression spring 19 extends around the ram or the lateral surface of the cavity. When a torque limit is reached, torque transmission element 7 slips out of depression 6, as is shown in FIGS. 8 and 9. Torque transmission element 7 runs over a tooth 15 of the external toothing system of transmission section 5 and can dip into adjacent depression 6. Torque transmission section 5 is not jointly moved by the swivelling motion of drive arm 3. With further swivelling of drive arm 3 about the screw rotation axis, following teeth 15 are also run over, so that no greater torque than the torque limit is transmitted to torque output element 4.

When switchover element 12 is moved into the blocking position represented in FIGS. 10 and 11, blocking elements 9 cannot move out of blocking recesses 10 assigned to them, because they are captured by abutment edge 14 in a form-fit manner in blocking recesses 10. In this operating position, torque transmission element 7 cannot leave depression 6 assigned to it even when a torque limit is exceeded, so that torques can also be transmitted in the blocking position of switchover element 12 which are greater than the torque limit and the screw driving tool can be used as a "normal" ratchet/wrench. The forces transmitted by torque transmission element 7 to ram 8 are transmitted via blocking elements 9 formed as a ball into the walls of window 11 of tube 23. Since tube 23 is connected tension-proof to head 2, the forces are diverted back again into head 2.

The above embodiments serve to explain the inventions covered as a whole by the application, which develop the prior art at least by the following combinations of features in each case also independently, wherein two, several or all of these combinations of features can also be combined, i.e.:

A screw driving tool, which is characterised in that a freewheel gear is provided in the torque transmission path between torque and torque output element 4 and torque transmission section 5. The freewheel gear comprises the toothing system 16, locking element 17, and the bearing recess 18.

A screw driving tool, which is characterised by a switchover element 12 which can be moved from a release position into a blocking position, which in the release position permits torque transmission element 7 to leave the depression, but in the blocking position blocks it.

A screw driving tool, which is characterised in that switchover element 12 is a sleeve part guided displaceably on housing 1 and cooperates with at least one blocking element 9, which in particular is mounted movably in a window 11 of housing 1 and is captured in particular in the blocking position in a blocking recess 10 of a ram 8, which is arranged in the force transmission section between torque transmission element 7 and force accumulator 19.

A screw driving tool, which is characterised in that ram 8 comprises two, three, four or more blocking recesses 10 arranged on a peripheral area in each case for the entry of an assigned blocking element 9.

A screw driving tool, which is characterised in that switchover element 12 forms with a first section of its inner wall a bypass space 13 for blocking elements 9 in the release position and forms with a second section of its inner wall an abutment edge 14 for blocking element 9 in the blocking position.

A screw driving tool, which is characterised in that the torque output element 4 is arranged in a head 2 formed by housing 1, wherein a drive arm 3 projects from head 2, in which a spring forming force accumulator 19 is arranged, which with the interposition of ram 8 acts on torque transmission element 7.

A screw driving tool, which is characterised in that depressions 6 are formed by tooth gaps arranged between teeth 15.

A screw driving tool, which is characterised in that switchover element 12 is linearly displaceable relative to the direction of extension of drive arm 3 between the blocking position and the release position.

A screw driving tool, which is characterised in that depression 6 is a trough, the wall of which extends in cross-section to axis A along a circular arc line, the radius whereof corresponds in particular to the radius of torque transmission element 7 constituted as a cylinder, wherein the arc length is smaller than a quarter circle, wherein the sections of the wall of depression 6 adjacent to the teeth forms inclined edges, so as to guide torque transmission element 7 out of depression 6.

All the disclosed features are essential to the invention (in themselves, but also in combination with one another). The disclosure content of the associated/appended priority documents (copy of the prior application) is thus also included in full in the disclosure of the application, also for the purpose of including features of these documents in the claims of the present application. The sub-claims characterise with their features, even without the features of a claim referred to, independent inventive developments of the prior art, in particular to implement divisional applications on the basis of these claims. The invention specified in each claim can also include one or more of the features in the above description, in particular provided with reference numbers and/or stated in the list of reference numbers. The invention also relates to embodiments, wherein individual ones of the features stated in the above description are not implemented, in particular inasmuch as they can be recognised as unnecessary for the given intended use or can be replaced by other technically equivalent means.

The invention claimed is:

1. A screw driving tool comprising:

a switchover element, a blocking element, a ram, a torque transmission element, a torque transmission section, a torque output element, a spring, an adjustment device, and a housing;

wherein the switchover element is movable from a release position into a blocking position:

wherein the ram acting on the torque transmission element is movably located in the housing and is biased by the spring;

wherein a pretension of the spring is adjustable by the adjustment device in order to adjust a torque limit;

wherein the switchover element cooperates with the blocking element, the blocking element being movable from a first position to a second position;

in the release position, the blocking element being in the first position and allowing movement of the ram, wherein the tool has a function of a torque wrench, transferring only torques which lie below the torque limit from the torque transmission element to the torque transmission section coupled to the torque output element;

in the blocking position, the blocking element being in the second position and inhibiting movement of the ram, wherein the tool has a function of a standard screw driving tool, with which torques can also be transferred from the torque transmission element to the torque transmission section which lie above the torque limit;

wherein the torque limit can be adjusted by the adjustment device.

2. The screw driving tool according to claim 1, wherein the torque output element which defines an axis is mounted in the housing; and the torque transmission element, is pretensioned by a force of a force accumulator which can be adjusted by the adjustment device.

3. The screw driving tool according to claim 2, wherein the torque transmission element engages in a depression of the torque transmission section, for coupling the torque transmission section to the housing so as to transmit the torques;

said torque-transmitting coupling being released when the torque transmission element leaves the depression in an edge-controlled manner against the force of the force accumulator, when the torque limit is exceeded;

the switchover element, in the release position permits the torque transmission element to leave the depression, but in the blocking position blocks the torque transmission element leaving the depression.

4. The screw driving tool according to claim 3, wherein the depression is a trough, a wall of which extends in cross-section to the axis along a circular arc line.

5. The screw driving tool according to claim 4, wherein a radius of the trough corresponds to a radius of the torque transmission element constituted as a cylinder, wherein an arc length of the radius of the trough is smaller than a quarter circle, wherein sections of the wall of the depression form inclined edges, so as to guide the torque transmission element out of the depression.

6. The screw driving tool according to claim 2, wherein the switchover element is a sleeve part guided displaceably on the housing and cooperates with the blocking element.

7. The screw driving tool according to claim 6, wherein the blocking element is mounted movably in a window of the housing.

8. The screw driving tool according to claim 6, wherein the blocking element is captured in the blocking position in a blocking recess of the ram, which is arranged in a force transmission path between the torque transmission element and the force accumulator.

9. The screw driving tool according to claim 8, further comprising two, three, four or more blocking elements, wherein the ram comprises two, three, four or more blocking recesses each configured to receive one of the two, three, four or more blocking elements, and wherein the two, three, four or more blocking recesses are arranged on a peripheral area of the ram.

10. The screw driving tool according to claim 8, wherein the torque output element is arranged in a head formed by the housing, wherein a drive arm projects from the head, in which the spring forming the force accumulator is arranged, which with an interposition of the ram acts on the torque transmission element.

11. The screw driving tool according to claim 10, wherein the switchover element is linearly displaceable relative to a direction of extension of the drive arm between the blocking position and the release position.

12. The screw driving tool according to claim 6, wherein the switchover element forms with a first section of its inner wall a bypass space for the blocking element in the release position and forms with a second section of its inner wall an abutment edge for the blocking element in the blocking position.

13. The screw driving tool according to claim 1, wherein a freewheel gear is provided in a torque transmission path between the torque output element and the torque transmission section.

* * * * *